(12) United States Patent
Gallagher, III

(10) Patent No.: US 6,315,548 B1
(45) Date of Patent: Nov. 13, 2001

(54) BOOKING APPARATUS

(75) Inventor: H. Michael Gallagher, III, Dayton, OH (US)

(73) Assignee: French Oil Mill Machinery Company, Piqua, OH (US)

(*) Notice: Subject to any disclaimer, the term of this patent is extended or adjusted under 35 U.S.C. 154(b) by 0 days.

(21) Appl. No.: 09/385,243

(22) Filed: Aug. 28, 1999

Related U.S. Application Data

(60) Provisional application No. 60/099,020, filed on Sep. 3, 1998.

(51) Int. Cl.[7] ............................. B29C 33/70; B29C 43/32
(52) U.S. Cl. ..................... 425/409; 100/233; 425/450.1; 425/453; 425/454
(58) Field of Search ........................... 425/453, 409, 425/454, 450.1; 249/170; 100/233

(56) References Cited

U.S. PATENT DOCUMENTS

| | | | |
|---|---|---|---|
| Re. 30,130 | 10/1979 | Edwards | 425/453 |
| 1,679,483 * | 8/1928 | Lewis | 425/355 |
| 1,709,921 | 4/1929 | Stacy | 425/409 |
| 3,142,093 | 7/1964 | Tribbett | 425/406 |
| 3,355,805 * | 12/1967 | Krueger et al. | 99/458 |
| 3,704,979 * | 12/1972 | Thiessen | 425/451 |
| 3,741,216 * | 6/1973 | Duarte et al. | 425/214 |
| 4,181,485 * | 1/1980 | Schramm | 425/88 |
| 4,726,754 | 2/1988 | Breuker et al. | 425/406 |
| 5,044,919 * | 9/1991 | Hama et al. | 425/443 |

* cited by examiner

Primary Examiner—Nam Nguyen
Assistant Examiner—Emmanuel Luk
(74) Attorney, Agent, or Firm—Biebel & French

(57) ABSTRACT

Improved booking drive mechanism for vertically extending mold presses such as SRIM mold presses. Opening and closing of the booking plate relative to its associated moveable ram are actuated by a pair of horizontally disposed hydraulic cylinders. Tension pulleys carried by the extendable pistons of the cylinders are trained around cables that connect the booking plate to the ram. When the pulleys are retracted into their cylinder housings, tension or pull on the cables causes the booking plate to move about a fulcrum to a closed position. Conversely, horizontal extension of the pistons away from the cylinders causes opening pivotal movement of the booking plate about the fulcrum thereby separating the booking plate from the ram.

15 Claims, 5 Drawing Sheets

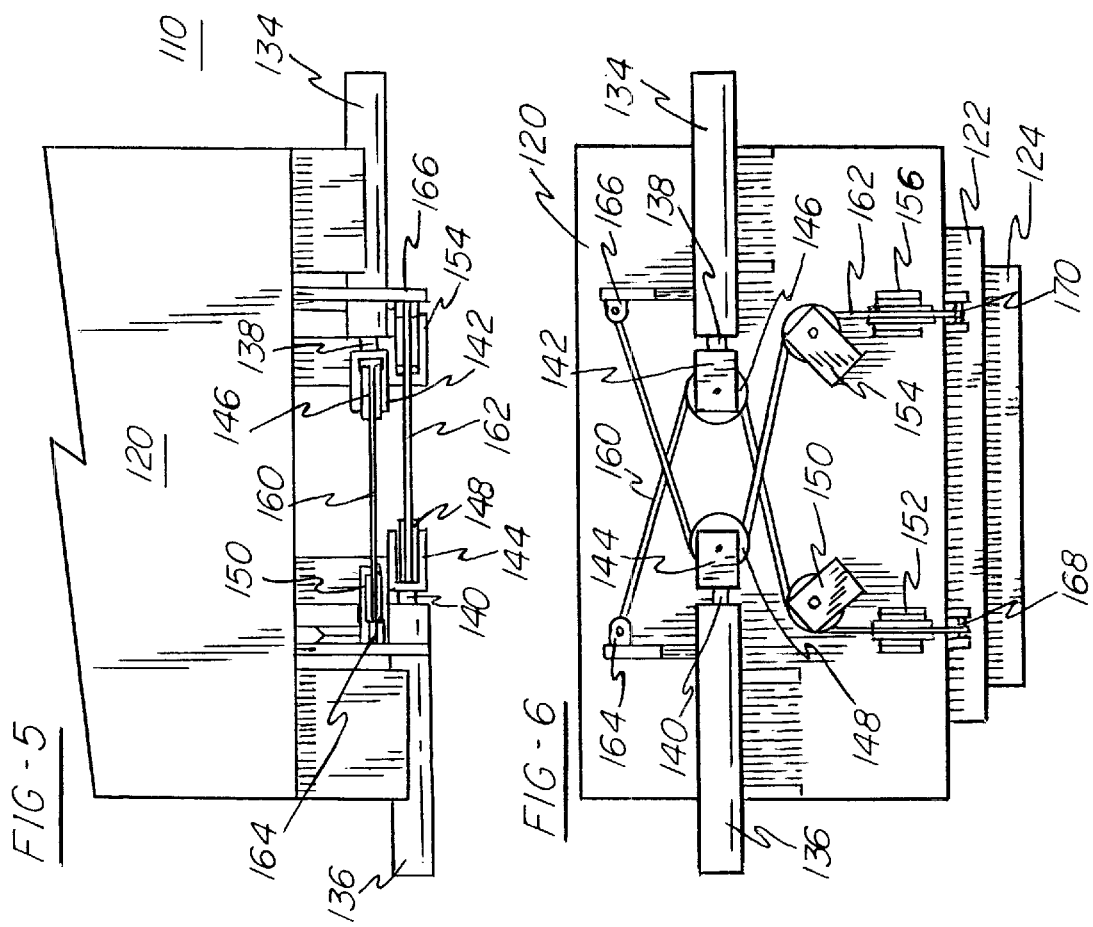

BOOKING APPARATUS

CROSS REFERENCE TO RELATED APPLICATION

The benefit of U.S. Provisional Application Ser. No. 60/099,020 filed Sep. 3, 1998 is claimed.

FIELD OF THE INVENTION

The present invention is related to large scale molding presses such as those designed for production of RIM (Reaction Injection Mold) parts in which an improved booking drive mechanism is employed.

BACKGROUND OF THE INVENTION

Commercial production of large scale plastic composite parts has become important in many industries including the automotive, appliance and airline industries. Significant interest lies in large structural RIM presses in which heated polymer components are mixed and reacted directly in the mold cavity. A host of other composite components such as fiberglass, graphite and the like may also be fed to the mold in addition to the desired polymeric or monomeric components in order to form the desired composite upon pressure consolidation.

Working pressure of such large scale SRIM molds can often be on the order of about 200,000 pounds. This, of course, dictates that the mold presses should be large with the vertical span of these often reaching to about 25 feet and with effective ram surface areas being on the order of 100 square feet and greater.

In many of these presses, a booking plate is detachably mounted to a moveable or ram and, in turn, one of the dies is detachably fixed to the booking plate. After the molding step, the dies are opened and then subsequently closed again so that rollers or the like on the booking plate can be received in tracks supported by the frame. Then, the booking plate and attached die are released from attachment to the ram and they can then be moved along the tracks away from their position under the ram so that the operator can gain access to the die for cleaning and other purposes. This additional mold closing step, after performance of the molding operation, adds to cycling or press down time between the actual molding steps of the cycle.

In some presses, the booking plate is pivotally mounted to the moveable ram by direct connection of hydraulic cylinders thereto, with the cylinder pistons actuating pivotal movement of the booking plates away from the moveable ram so that the press operator may gain access to the die. Direct connection of the booking plate to the pivot drive cylinders dictates that these cylinders should be generally vertically disposed, substantially parallel to the longitudinal axis of the SRIM apparatus. Addition of lengthy piston displacement along the vertical axis of these machine requires additional overhead spatial requirements, which, in many factories cannot be accommodated without removal of overhead ceilings.

Accordingly, there is a need in the art to provide a pivot drive connection for booking plates in large scale SRIM machines that minimizes overhead spatial requirements.

There is also a need in the art for a SRIM machine that may cycle quickly from molding step to next successive molding step.

SUMMARY OF THE INVENTION

These and other objects are met by the instant invention which in basic form comprises an improvement in vertically extending SRIM presses of the type in which a vertically moveable ram member is driven against a base carrying a lower die. The molding press includes a booking plate pivotally mounted to the moveable ram member and an upper die detachably mounted to the underside of the booking plate. The upper die is adapted to form a mold cavity with the lower die.

Instead of direct connection of the booking plate to vertically disposed hydraulic cylinders or the like which require excessive overhead machine space, pivotal drive for the booking plate is actuated by a pair of horizontally disposed cylinders that are connected via cable connection to the booking plates to translate horizontal displacement of the cylinder pistons to vertical displacement of the cables that are fixedly attached to the booking plate.

In the preferred embodiment of the invention, horizontal extension of the pistons from their associated cylinders relaxes the cables, thus allowing the booking plate to pivot outwardly away from its associated ram. The operator may then gain access to the surface of the upper die for cleaning and maintenance.

Upon opposite horizontal displacement or movement of the pistons back toward their associated cylinders, the cables are pulled under tension to, in turn, pivotally close the booking plate to its position in abutting relation to and under the movable ram, ready for initiation of the RIM molding process.

The invention will be further described in conjunction with the attached drawings to be read along with the following detailed description.

BRIEF DESCRIPTION OF THE DRAWINGS

FIG. 5 is a schematic top view of a moveable ram that is provided with a booking plate pivot drive mechanism in accordance with the invention;

FIG. 6 is a schematic rear end view of the moveable ram and booking plate and upper die assembly showing the booking plate drive mechanism with the booking plate in its closed or mold ready position;

FIG. 7 is a schematic side view of the moveable ram assembly shown in FIG. 6;

DETAILED DESCRIPTION OF THE PREFERRED EMBODIMENT

Figure 2:
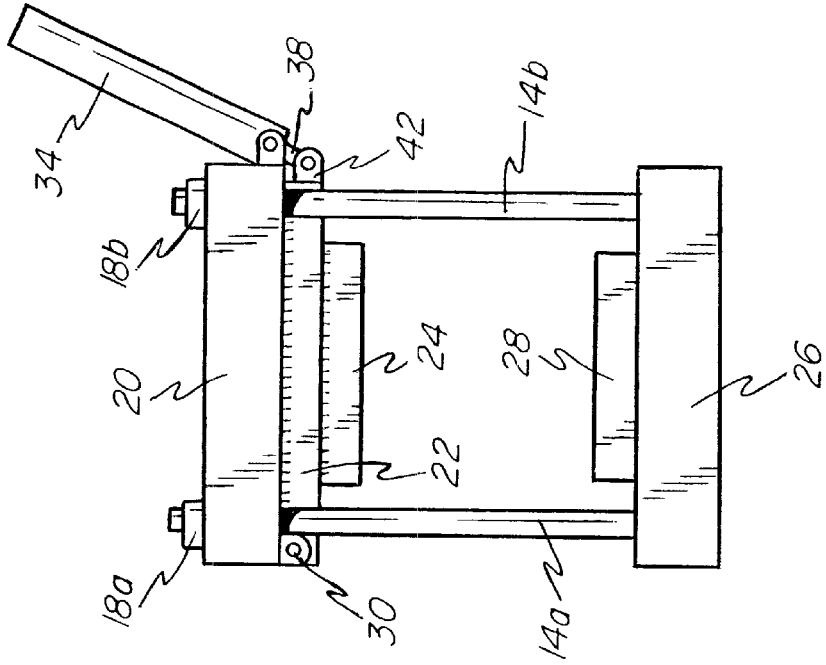
FIG. 2 is a schematic side view of the prior art press shown in FIG. 1.
Figure 1:
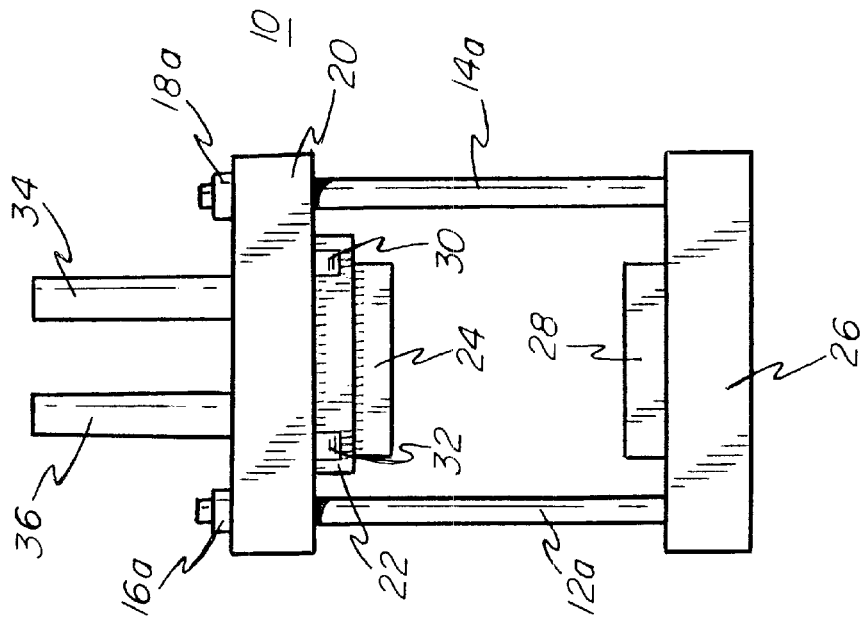
FIG. 1 is a front schematic view of a prior art mold press.
Figure 4:
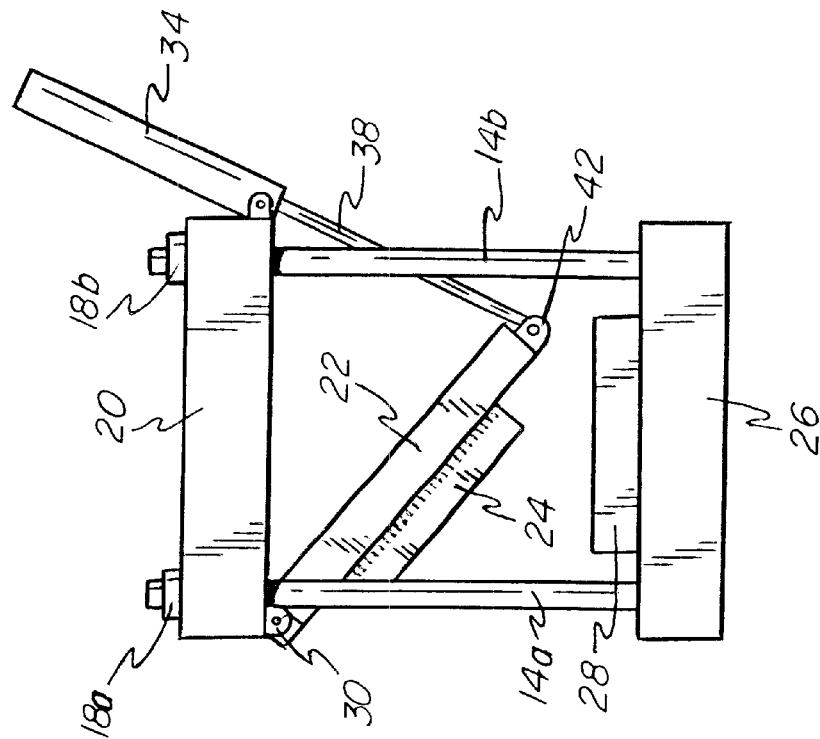
FIG. 4 is a schematic side view of the prior art press shown in FIG. 1 with the booking plate in its opened accessible condition.

Turning first to the prior art mold press of FIGS. 1–4 for an understanding of general structural features and principles of operation of SRIM presses in general, there is shown press 10 having four parallel vertically extending upstanding "cylinders" marked as left hand cylinders 12a,b and right hand cylinders 14a,b with the front cylinders designated as 12a and 14a and rear cylinders 12b,14b. Moveable ram 20 is positioned at the top of the press and is adapted for vertical movement into and out of engagement with base 26. The moveable ram 20 is connected to booking plate 22 at pivot mounts 30,32 (FIG. 2 and 4). An upper die 24 is secured to the underside of the booking plate in conventional manner so that the dies may be changed to correspond to produce different molded parts.

Superposed over base 26 is a lower die 28. As is conventional in the art, the lower die may be placed in its position over the base by transporting it to this location by a rolling bolster or the like. When the ram and its associated upper die are in pressing engagement with the lower die, the dies cooperate to form a mold cavity therebetween.

The moveable ram moves vertically along the cylinders 12a,b, 14a,b in conventional manner, such as for example shown in U.S. Pat. No. 4,726,754 (Breuker et al.), the entire disclosure of which is incorporated herein. Stop members 16a,b, 18a,b prevent vertical movement above the top of the cylinders.

Turning now specifically to FIG. 2, one 34, of a pair 34,36 of hydraulically activated cylinders is shown and is directly connected to the booking plate 22 as shown at 42. As shown, the cylinder 34 extends vertically above the height of the cylinders 12a, b, 14a, b and, as previously noted in the background of the invention, this disposition is problematic in large scale SRIM devices because of the excessive overhead clearance required.

Figure 3:
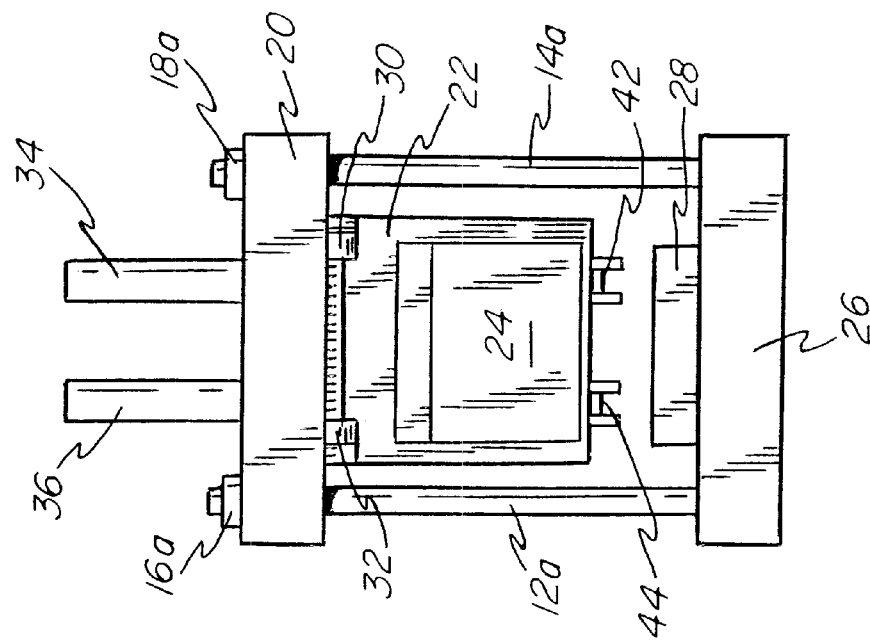
FIG. 3 is a schematic front view of the prior art press shown in FIG. 1 with the booking plate in its opened or "booked" condition for allowing operator access thereto.

Turning now to FIGS. 3 and 4, a prior art mechanism is shown in its open or "booked" position whereby the press operator can gain access to the upper mold area. Here, pistons 38,40 extend from their associated cylinders 34,36 to pivot booking plate away from its position in abutment with the underside of the moveable ram 20.

Turning now to an explanation of the present invention and with specific reference to FIGS. 5–7 of the application, moveable ram 120 is provided and is adapted for positioning on the press and functions similar to the ram 20 shown in FIGS. 1–4. Booking plate 122, in the closed position shown in FIGS. 5–7, is positioned in abutting relation under the ram 120. The upper die 124 is detachably secured to the bottom of booking plate 122 through conventional attachment means not shown. The booking plate is pivotally attached to the moveable ram as shown at 130 with a similar pivotal connection made at the side opposite from the side of the ram shown in FIG. 7. Although these are not shown in the drawings, the booking plate may be "locked" to the ram by the use of conventional hydraulically loaded pins and the like such as those shown in the '754 Breuker et al. patent.

In order to actuate opening (ie booking) and closing pivotal movement of the booking plate and is attached upper die 124 relative to the moveable ram, a pair of horizontally disposed hydraulically activated cylinders 134,136 are fixed to the rear side of the moveable ram. Each of the cylinders is provided with horizontally reciprocable pistons 138,140 respectively which pistons carry at their ends, tension adjustment pulleys 146,148 respectively that are suitably journalled for rotation in journal boxes 142,144 respectively.

Cables 160,162 are provided for cooperation with the tension pulleys 146,148. One end of each of the cables is fixed to the rear end of the moveable ram as shown at 164 and 166, with the other ends of the cables fixed to the booking plate as shown at 168, and 170. Cable 160 extends from attachment 164 to attachment 168 with the cable trained thru tension pulley 146 and then around guide pulleys 150,152. Cable 162 extends from attachment 166 to attachment 170 thru tension pulley 148 and then around guide pulleys 154, 156 as shown.

As shown in FIGS. 5–7, when the booking plate is to be positioned in the mold ready or closed position, the pistons 138,140 are retracted within their associated cylinders thereby exerting a pulling tension on the cables to thereby close the booking plate into its position as shown in FIG. 7 and to maintain the booking plate in this position until actuated.

As can be seen best in FIG. 5, the cylinders 134, 136 are both fixed to the back of ram 120 but they are positioned, in parallel with each other along separate vertical planes so that action of one of the cylinders and its associated cable will not interfere with the other.

Figure 8:
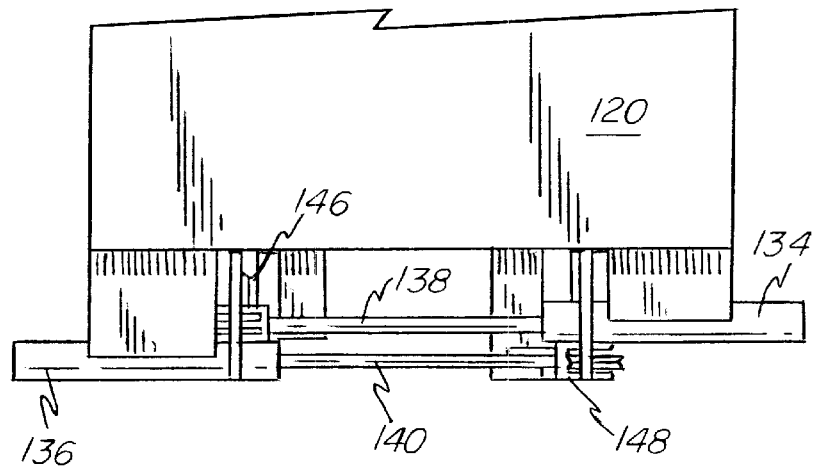
FIG. 8 is a schematic top view of a ram assembly in accordance with the invention in which the booking plate is in its "booked" or open position for allowing operator access thereto.
Figure 9:
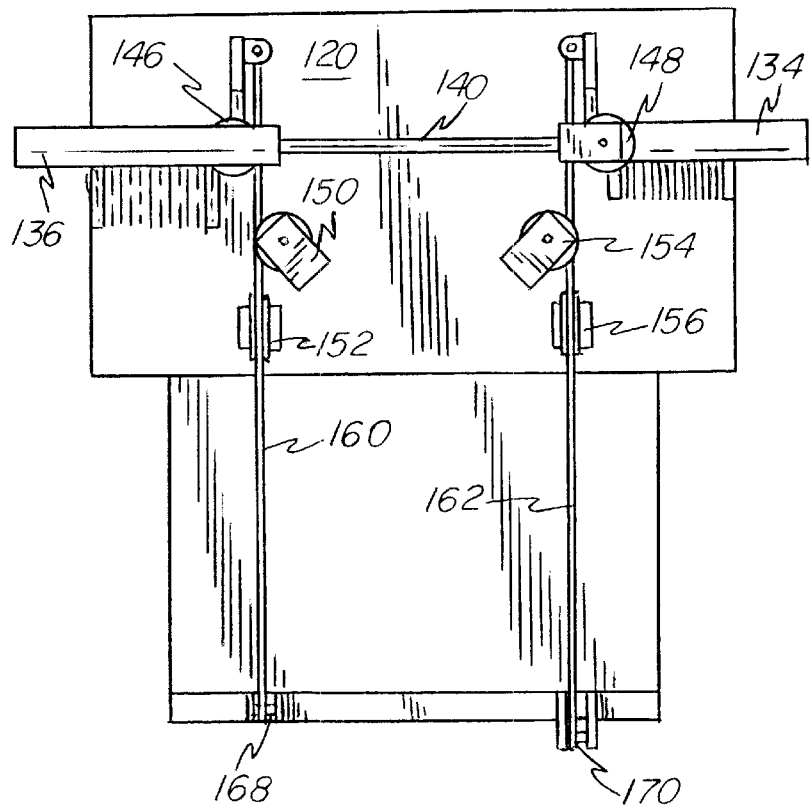
FIG. 9 is a schematic rear end view of the moveable ram assembly shown in FIG. 8 and illustrating the booking plate drive mechanism of the invention.
Figure 10:
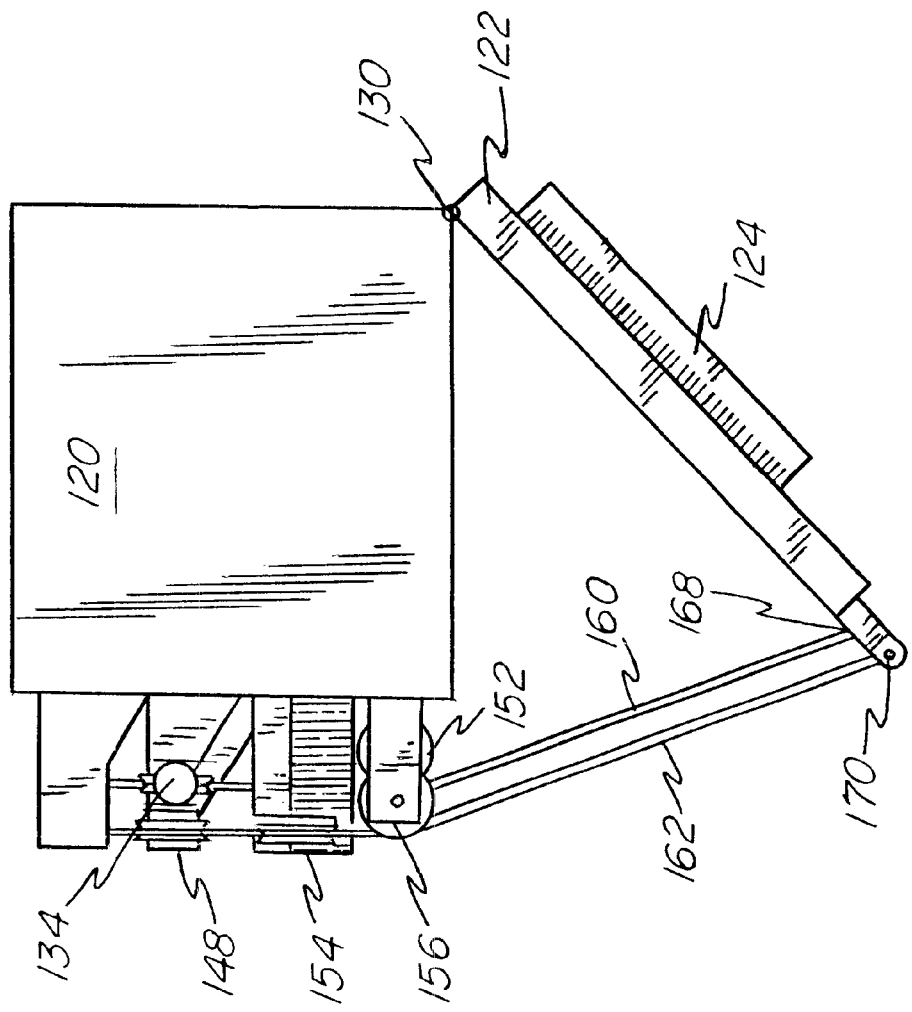
FIG. 10 is a schematic side view of the moveable ram assembly shown in FIG. 9.

FIGS. 8–10 illustrate pivoting movement of the booking plate to its open or "booked" position. Here, the pistons 138,140 are moved to their fullest extensions to thereby relax tension on the cables 160,162. The booking plate 122 is thereby allowed to pivot to its open position. Signal for hydraulic actuation of the cylinders can be given thru general CPU control units acting through solenoids or other similar means It is therefore apparent that the present invention provides advantage in minimizing the overheard spatial requirements for SRIM and other large scale mold press apparatus in that the drive means for actuating pivotal movement of the booking plate is horizontally disposed, and horizontal action of the pistons associated with the hydraulic cylinders is translated into vertical upward and downward movement of the booking plate around its fulcrum. Additionally, the cycle time between successive molding steps is decreased because, in contrast to many of the prior art devices, tracks or rollers are not needed to enable removal of the booking plate from its associated movable RIM. In accordance with the instant invention, while the mold is opening after completion of the molding step, the press may be "booked" concurrently by actuation of the hydraulic drive pistons. The booking plate moves against the relaxing tension of the cables.

Although horizontally disposed hydraulic drive pistons and associated tension pulleys have been shown herein as the preferred embodiment, the skilled artisan will also appreciate that a variety of other mechanisms may be used to translate horizontal motion into the desired vertical lifting and closing of the booking plate. For example, rack and pinion, linear ball screw and other linear drive mechanisms, positioned horizontally along the back of the movable RIM, may also function suitably.

Although the invention has been specifically described in conjunction with a vertically disposed SRIM press, benefits of the invention may be enjoyed in conjunction with a variety of vertically disposed mold presses of the type having a base member carrying a lower die, and an upper die member that is displaceable between vertical positions for selective movement between an open position and a closed mold position.

Although this invention has been described with respect to a certain preferred embodiment, it will be appreciated that a wide variety of equivalents may be substituted for those specific elements shown and described herein, all without departing from the spirit and scope of the invention as defined in the appended claims.

What is claimed is:

1. An apparatus for vertically disposed mold pressing having a base member carrying a lower die member, a moveable ram member carrying an upper die member and wherein said moveable ram member is displaceable between vertical positions for selective movement between an open position and a closed mold position in which said closed mold position said upper and lower die members are in contact and define a mold cavity therebetween, a booking plate pivotally connected to said moveable ram member member and carrying said upper die member, and an improved drive linkage comprising:

a cable having two end, one of said cable ends fixedly secured to said moveable ram member with the other of said ends fixedly secured to said booking plate;

a drive member in operative association with said cable, said drive member selectively (1) pulling said cable to pivotally move said booking plate into a closed position in abutting relation to said ram and (2) relaxing said cable to pivotally lower said booking plate away from said moveable ram member, wherein said improved drive linkage pivotally lowers said booking plate away from said moveable ram member to an open position in which access to said upper die member may be gained.

2. An apparatus according to claim 1 wherein said drive member comprises a moveable tension adjustment pulley.

3. An apparatus according to claim 2 further comprising a hydraulically activated piston, said moveable tension adjustment pulley being carried by said hydraulically activated piston.

4. An apparatus for vertically disposed mold pressing having a base member carrying a lower die member, a moveable ram member carrying an upper die member and being displaceable between vertical positions for selective movement between an open position and a closed mold position wherein in said closed mold positions said upper and lower die members are in contact and define a mold cavity therebetween, and a booking plate pivotally connected to said moveable ram member and carrying said upper die member, and an improved drive linkage comprising:

a cable having two ends, one end of said cable fixed to said moveable ram member and the other end of said cable attached to said booking plate, actuation means attached to said cable for selectively (1) pulling said cable to move said booking plate to a closed position and (2) relaxing said cable to move said booking plate to a booked position, wherein said improved drive linkage pivotally lowers said booking plate away from said moveable ram member to a booked position in which access to said upper die member may be gained and a closed position under and in abutting relation to said moveable ram member.

5. An apparatus according to claim 4 wherein said actuation means comprises a horizontally extendable, hydraulically activated piston.

6. An apparatus according to claim 5 further comprising a tension adjustment pulley and wherein said hydraulically activated piston carries said tension adjustment pulley, said cable trained about said tension adjustment pulley intermediate said ends of said cable.

7. An apparatus according to claim 6 further comprising a guide pulley in contact with said cable.

8. An apparatus according to claim 6 further comprising a plurality of guide pulleys each in contact with said cable.

9. An apparatus for mold press comprising:

a vertically extending frame, a base member connected to said frame, a lower die member mounted on said base member a moveable ram member connected to said frame, said moveable ram member being vertically moveable along said frame into and out of engagement with said lower die, a booking plate pivotally mounted to said moveable ram member, an upper die member mounted to said booking plate, a first and second cable each having a first and second ends, said first ends of said cables fixedly secured to said moveable ram, the second ends of said cables fixedly secured to said booking plate, first and second hydraulically activated pistons, said first hydraulically activated piston carrying a first tension adjustment pulley, said second hydraulically activated piston carrying a second tension adjustment pulley, said first cable trained about said first tension adjustment pulley at a location intermediate the first and second ends of said first cable, said second cable trained around said second tension adjustment pulley at a location intermediate the first and second ends of said second cable; each of said first and second tension adjustment pulleys being horizontally displaceable between a first and a second position, wherein said first position said cables are pulled to thereby raise said booking plate into abutting engagement with said moveable ram member, and in said second position said cables are relaxed so that said backing plate is pivoted away from said abutting engagement into an access position.

10. An apparatus according to claim 9 further comprising a plurality of first guide pulleys in guiding contact with said first cable, and a plurality of second guide pulleys in guiding contact with said second cable.

11. An apparatus according to claim 9 wherein said first and second hydraulically activated pistons are mounted to said moveable ram.

12. An apparatus according to claim 11 wherein said first and second hydraulically activated pistons are disposed along different vertical plates.

13. An apparatus for vertically disposed mold pressing having a base member carrying a lower die member, a moveable ram member carrying an upper die member, a booking plate pivotally connected to said moveable ram member, and an improved drive linkage comprising:

a cable having two ends, one of said cable ends fixedly secured to said moveable ram member and the other of said ends fixedly secured to said booking plate; and a horizontally moveable member in operative association with said cable, said horizontally moveable member selectively (1) pulling said cable to pivotally move said booking plate into a closed position in abutting relation to said moveable ram member and (2) relaxing said cable to pivotally lower said booking plate away from said moveable ram member, wherein said improved drive linkage pivotally moves said booking plate away from said moveable ram member to an open position in which access to said upper die member may be gained.

14. An apparatus according to claim 13 wherein said horizontally moveable member comprises a moveable tension adjustment pulley.

15. An apparatus according to claim 14 further comprising a hydraulically activated piston, said moveable tension adjustment pulley being carried by said hydraulically activated piston.

* * * * *